US012668321B2

(12) United States Patent
Wang

(10) Patent No.: US 12,668,321 B2
(45) Date of Patent: Jun. 30, 2026

(54) QUADRUPED ROBOT BODY HAVING FLEXIBLE BUFFER STRUCTURE AND QUADRUPED ROBOT

(71) Applicant: HangZhou YuShu TECHNOLOGY CO., LTD., Hangzhou City (CN)

(72) Inventor: Xingxing Wang, Hangzhou City (CN)

(73) Assignee: HANGZHOU YUSHU TECHNOLOGY CO., LTD., Hangzhou (CN)

( * ) Notice: Subject to any disclaimer, the term of this patent is extended or adjusted under 35 U.S.C. 154(b) by 452 days.

(21) Appl. No.: 18/248,785

(22) PCT Filed: Nov. 30, 2021

(86) PCT No.: PCT/CN2021/134246
§ 371 (c)(1),
(2) Date: Apr. 12, 2023

(87) PCT Pub. No.: WO2022/078529
PCT Pub. Date: Apr. 21, 2022

(65) Prior Publication Data
US 2023/0303192 A1 Sep. 28, 2023

(30) Foreign Application Priority Data

Oct. 12, 2020 (CN) ......................... 202022260055.X

(51) Int. Cl.
*B25J 19/00* (2006.01)
*B25J 17/00* (2006.01)
(Continued)

(52) U.S. Cl.
CPC ............ *B62D 57/032* (2013.01); *B25J 17/00* (2013.01); *B25J 19/0075* (2013.01);
(Continued)

(58) Field of Classification Search
CPC .... B25J 17/00; B25J 19/0075; B25J 19/0091; B62D 57/032; F16F 15/08
See application file for complete search history.

(56) References Cited

U.S. PATENT DOCUMENTS

2020/0282554 A1* 9/2020 Wang ................... B25J 19/0054

FOREIGN PATENT DOCUMENTS

CN         101825149 A    9/2010
CN         202349092 U    7/2012
                    (Continued)

*Primary Examiner* — Tinh T Dang
(74) *Attorney, Agent, or Firm* — MUNCY, GEISSLER, OLDS & LOWE, P.C.

(57) ABSTRACT

A quadruped robot body having a flexible buffer structure includes a housing having an accommodating cavity, a buffer connection portion capable of connecting to a fixed end of a joint unit being provided at at least one position on the housing. The buffer connection portion is provided with a connection hole for fixedly connecting to the joint unit. One or more strip-shaped holes are provided in a region where the buffer connection portion connects to the housing. Further disclosed is a quadruped robot. The strip-shaped hole is provided on the buffer connection portion, and under the action of an external force, the strip-shaped hole can deform slightly to generate a slight displacement between the hole wall and a surrounding region, thus achieving buffering of the external force. The present invention features a simple structure, low manufacturing costs, no need to reserve an additional mounting space, and a compact structure.

16 Claims, 5 Drawing Sheets

(51) Int. Cl.
    *B62D 57/032*     (2006.01)
    *F16F 15/04*     (2006.01)
    *F16F 15/08*     (2006.01)

(52) U.S. Cl.
    CPC ........... *B25J 19/0091* (2013.01); *F16F 15/04*
                 (2013.01); *F16F 15/08* (2013.01)

(56)                References Cited

FOREIGN PATENT DOCUMENTS

| CN | 104386157 A | * | 3/2015 | ........... B62D 57/032 |
| CN | 206579733 U | * | 10/2017 | ........... B62D 57/032 |
| CN | 110605739 A | | 12/2019 | |
| CN | 210027662 U | | 2/2020 | |
| CN | 213799961 U | | 7/2021 | |
| JP | 11254357 A | | 9/1999 | |
| KR | 100881288 B1 | * | 2/2009 | ........... B62D 57/022 |

* cited by examiner

QUADRUPED ROBOT BODY HAVING FLEXIBLE BUFFER STRUCTURE AND QUADRUPED ROBOT

TECHNICAL FIELD

The present invention relates to a quadruped robot body having a flexible buffer structure and a quadruped robot, pertaining to the field of quadruped robot anticollision buffer.

BACKGROUND

The Chinese patent (Publication No.: CN210027662U) discloses a robot body joint anticollision structure and a quadruped robot using same, including an adapter provided between a robot body and a hip joint connection rod. The adapter includes a first connection portion and a second connection portion that can slide relative to each other. The first connection portion is fixedly connected to the hip joint connection rod, and the second connection portion is connected to the robot body. An elastic member is provided between the first connection portion and the second connection portion. When the hip joint connection rod is subjected to a lateral external force, the first connection portion slides relative to the second connection portion and compresses the elastic member. The sliding of the first connection portion prevents a rigid connection between the hip joint connection rod and the robot body, and thus plays a role of protecting the hip joint of the legged robot. Furthermore, the first connection portion can rotate about the robot body together with the hip joint connection rod, Therefore, no matter where the hip joint connection rod is impacted after rotation, the first connection portion can always protect the hip joint of the legged robot.

BRIEF SUMMARY

Technical Problem

The above solution achieves an anticollision connection between the hip joint connection rod and the robot body by adding a guide rail, a slide block, and a spring structure. However, the above solution introduces many parts and components, leading to a complex structure and high manufacturing costs. In this case, the weight of the robot is increased, and a mounting space needs to be reserved, resulting in a large robot size and an incompact structure.

Solution of the Problem

Technical Solution

In view of the defect in the prior art, the present invention aims at providing a quadruped robot body having a flexible buffer structure and a quadruped robot, with an anticollision structure having a strip-shaped hole. Under the action of an external force, the strip-shaped hole can deform slightly to achieve buffering of the external force. The present invention features a simple structure, low manufacturing costs, and a compact structure.

To achieve the above objective, the first technical solution of the present invention is as follows:

A quadruped robot body having a flexible buffer structure includes:

a housing having an accommodating cavity.

A buffer connection portion capable of connecting to a fixed end of a joint unit is provided at at least one position on the housing.

The buffer connection portion is provided with a connection hole for fixedly connecting to the joint unit.

One or more strip-shaped holes are provided in a region where the buffer connection portion connects to the housing.

After continuous exploration and test, the present invention breaks the technical inertia of the prior art in achieving anticollision always by adding components. In the present invention, the strip-shaped hole is provided on the buffer connection portion. Under the action of an external force, the strip-shaped hole can deform slightly to generate a slight displacement between the hole wall and a surrounding region, forming a flexible buffer structure and thus achieving buffering of the external force.

Furthermore, the present invention features a simple structure, low manufacturing costs, no need to reserve an additional space for mounting a buffer structure, and a more compact structure. The solution is ingenious in conception and is feasible.

Additionally, since the connection hole is a key node for transferring the external impact force, the strip-shaped hole being disposed adjacent to the connection hole can buffer the external impact force to the greatest extent, thus achieving a good buffering effect.

In a preferred technical solution:

The strip-shaped hole is arch-shaped, U-shaped, or arc-shaped.

The strip-shaped hole is preferably arch-shaped or U-shaped so as to have a wide deformable area, which can effectively buffer impact forces applied in all directions. The solution features a simple structure, a good buffering effect, and low production costs.

In a preferred technical solution:

At the end of the housing, a plurality of sets of buffer connection portions for fixing the two joint units are provided on the same side; and the plurality of sets of buffer connection portions are arranged symmetrically on the left and right with respect to the central line of the housing.

The buffer connection portions are symmetrically arranged on the left and right, so that the force on the entire housing is uniform, achieving good consistency in the buffering effect and aesthetics in the structure.

In a preferred technical solution:

At least one elastomer is provided between the inner wall of the accommodating cavity of the housing and the joint unit.

The elastomer protrudes from the inner wall surface of the cavity of the housing, and can abut on the rear end of an outer casing of the joint unit, so that the joint unit and the housing can be tightly fitted together to prevent the buffer connection portion from loosening during use.

In a preferred technical solution:

The buffer connection portion is made of a material having elasticity, which is nylon or polycarbonate (PC) or ABS plastic that features low costs and easy manufacturing.

In a preferred technical solution:

The elastomer is a spring or a compression spring or is made of elastic polyurethane or a rubber material that features a simple structure and low costs.

In a preferred technical solution:

The width of the strip-shaped hole is 0.1-3 mm, so that the buffer connection portion can have the ability of deformation while maintaining the structural strength thereof, thus achieving effective buffering of the external impact force.

In a preferred technical solution: a seal is provided in or around the strip-shaped hole to prevent water or dust from entering the housing via the strip-shaped hole. The elastic seal can be elastic rubber, a sealing cloth, or a sealing tape.

To achieve the above objective, the second technical solution of the present invention is as follows:

A quadruped robot body having a flexible buffer structure includes:

a housing having an accommodating cavity.

A buffer connection portion capable of connecting to a fixed end of a joint unit is provided at at least one position on the housing.

One or more strip-shaped holes are provided in a region where the buffer connection portion connects to the housing.

Under the action of an external force, the strip-shaped hole can deform to generate a displacement between the hole wall and a surrounding region, forming a flexible buffer structure and thus achieving buffering of the external force.

After continuous exploration and test, the present invention breaks the technical inertia of the prior art in achieving anticollision always by adding components. In the present invention, the strip-shaped hole is provided on the buffer connection portion. Under the action of an external force, the strip-shaped hole can deform slightly to generate a slight displacement between the hole wall and a surrounding region, forming a flexible buffer structure and thus achieving buffering of the external force.

The present invention features a simple structure, low manufacturing costs, and a compact structure. The solution is ingenious in conception and is feasible.

Additionally, since the surrounding region where the housing connects to the fixed end of the joint unit is a key node for transferring the external impact force, the strip-shaped hole being disposed in this region can buffer the external impact force to the greatest extent, thus achieving a good buffering effect.

In a preferred technical solution adopting the quadruped robot body having a flexible buffer structure:

A quadruped robot includes:

a quadruped robot body having a flexible buffer structure as stated above, and a joint unit.

The joint unit is mounted on a housing by means of a buffer connection portion.

An impact force on the joint unit can be buffered and attenuated by deformation of the buffer connection portion.

In the present invention, a strip-shaped hole is provided on the buffer connection portion. When the robot is impacted by an external force, the external force can be buffered and attenuated by the deformation of the buffer connection portion, thus achieving buffering of the external force. The present invention features a simple structure, low manufacturing costs, no need to reserve an additional space for mounting a buffer structure, and a compact structure. The solution is ingenious in conception and is feasible.

In a preferred technical solution:

The joint unit includes an outer casing end fixed in the housing and a rotary output end exposed from the housing.

The outer casing end is screwed to the housing, and the housing is provided with the buffer connection portion at a screw connection with the joint unit.

Since the screw connection with the joint unit is a key node for bearing the external impact force, the buffer connection portion having a strip-shaped hole being disposed at the screw connection can buffer the external impact force to the greatest extent, thus achieving a good buffering effect.

Beneficial Effects of the Invention

Beneficial Effects

After continuous exploration and test, the present invention breaks the technical inertia of the prior art in achieving anticollision always by adding components. In the present invention, the strip-shaped hole is provided on the buffer connection portion. Under the action of an external force, the strip-shaped hole can deform slightly to generate a slight displacement between the hole wall and a surrounding region, forming a flexible buffer structure and thus achieving buffering of the external force.

Furthermore, the present invention features a simple structure, low manufacturing costs, no need to reserve an additional space for mounting a buffer structure, and a more compact structure. The solution is ingenious in conception and is feasible.

BRIEF DESCRIPTION OF THE DRAWINGS

Description of the Drawings

Figure 1:
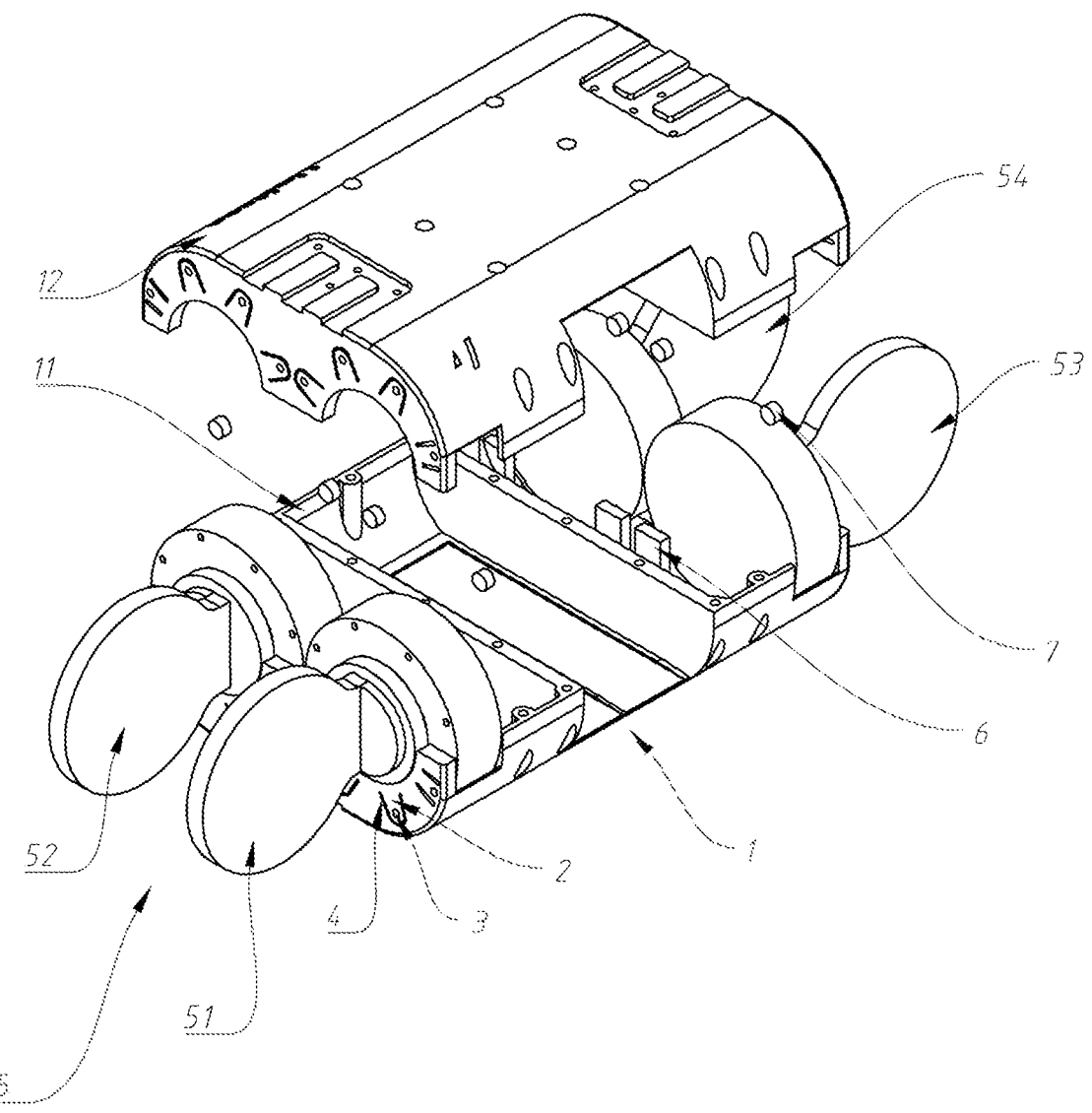

FIG. 1 is an exploded schematic diagram of the present invention.

Figure 2:
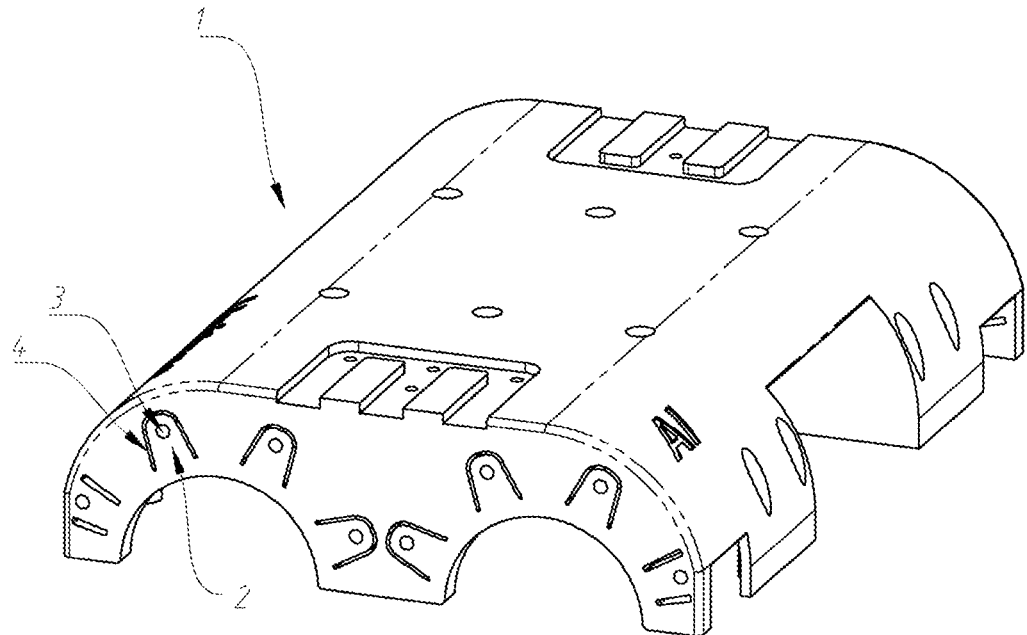

FIG. 2 is a schematic diagram of a housing of the present invention.

Figure 3:
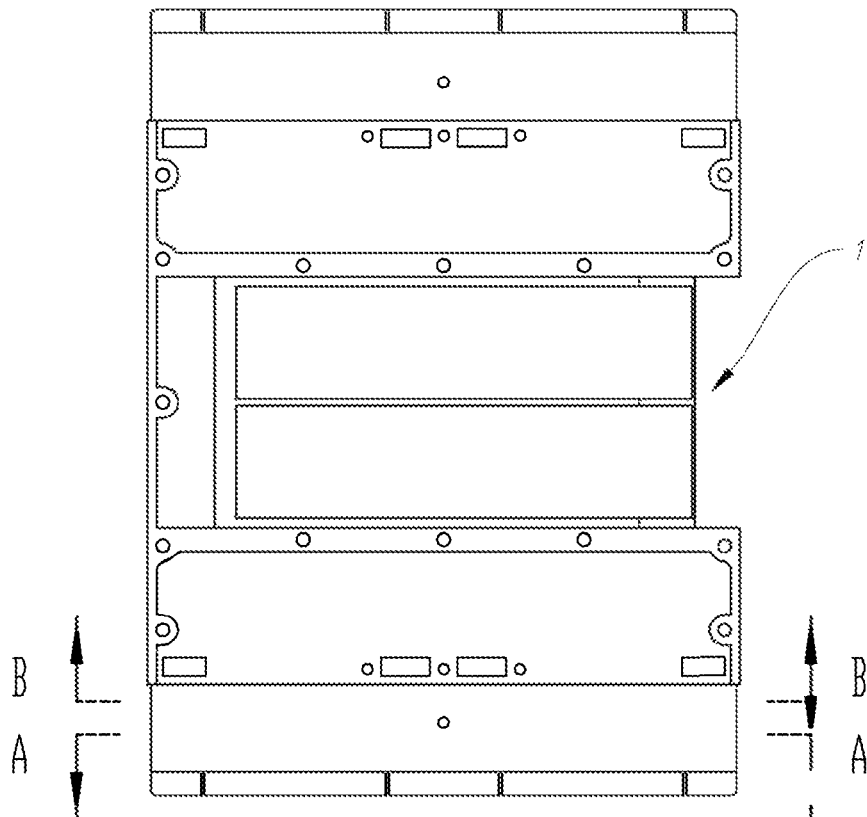

FIG. 3 is a bottom view of the structure shown in FIG. 2.

Figure 4:
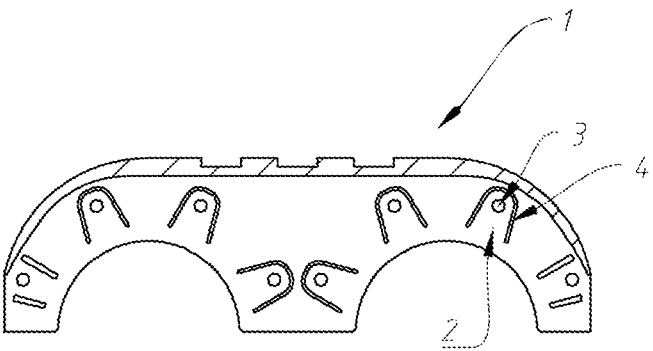

FIG. 4 is a sectional view of the structure shown in FIG. 3 along an A-A direction.

Figure 5:
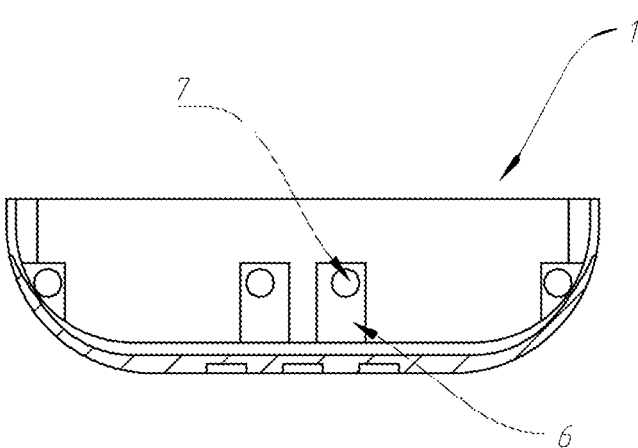

FIG. 5 is a sectional view of the structure shown in FIG. 3 along a B-B direction.

Figure 6:
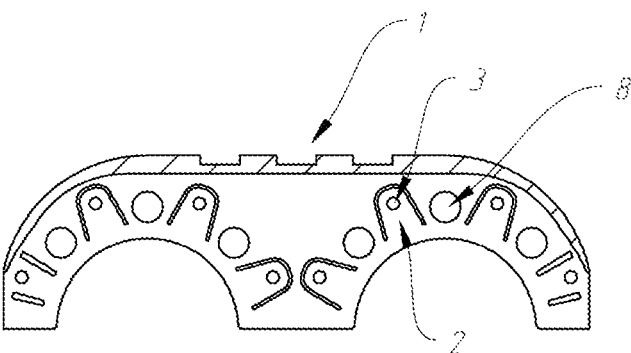

FIG. 6 is another schematic diagram of the housing of the present invention.

DESCRIPTION OF THE REFERENCE SIGNS

1. Housing; 11. upper body frame; 12. lower body frame; 2. buffer connection portion; 3. connection hole; 4. strip-shaped hole; 5. joint unit; 51. left front power unit; 52. right front power unit; 53. left rear power unit; 54. right rear power unit; 6. reinforcing plate; 7. elastomer; 8. fixing hole.

DETAILED DESCRIPTION OF THE INVENTION

Embodiments of the Present Invention

In order to make the objective, technical solution, and advantages of the present invention clearer, the present invention is described in detail below with reference to the drawings and embodiments. It should be understood that the specific embodiments described herein are only intended to explain the present invention but are not for limiting the present invention.

On the contrary, the present invention covers any substitution, modification, equivalent method and solution made within the essence and scope of the present invention and defined by the claims. Further, in order to enable the public to have a better understanding of the present invention, some specific details are described in the following detailed description of the present invention. A person skilled in the art can still fully understand the present invention without the description of these details.

It should be noted that when two components are "fixedly connected" to each other, the two components can be directly connected to each other or can be connected via an intermediate component. On the contrary, when a component is defined to be "directly on" another component, there is no intermediate component. The terms "up", "down", "front", "rear" and similar expressions used herein are only intended for description.

As shown in FIGS. 1-4, a quadruped robot body having a flexible buffer structure includes a housing 1 having an accommodating cavity. The housing 1 includes an upper body frame 11 and a lower body frame 12.

The upper body frame 11 and the lower body frame 12 are fixed together to form the housing 1 having an accommodating cavity.

A buffer connection portion 2 capable of connecting to a fixed end of a joint unit 5 is provided at at least one position on the housing 1.

The buffer connection portion 2 is provided with a connection hole 3 for fixedly connecting to the joint unit 5.

One or more strip-shaped holes 4 are provided in a region where the buffer connection portion 2 connects to the housing.

After continuous exploration and test, the present invention breaks the technical inertia of the prior art in achieving anticollision always by adding components. In the present invention, the strip-shaped hole 4 is provided on the buffer connection portion 2. Under the action of an external force, the strip-shaped hole 4 can deform slightly to generate a slight displacement between the hole wall and a surrounding region, thus achieving buffering of the external force. The present invention features a simple structure, low manufacturing costs, no need to reserve an additional mounting space, and a compact structure. The solution is ingenious in conception and is feasible.

Additionally, since the connection hole 3 is a key node for transferring the external impact force, the strip-shaped hole 4 being disposed adjacent to the connection hole 3 can buffer the external impact force to the greatest extent, thus achieving a good buffering effect.

Specific embodiment of the structure of the strip-shaped hole 4 of the present invention:

The strip-shaped hole 4 is arch-shaped, U-shaped, or arc-shaped.

The strip-shaped hole 4 is preferably arch-shaped or U-shaped so as to have a wide deformable area, which can effectively buffer impact forces applied in all directions. The solution features a simple structure, a good buffering effect, and low production costs.

The width of the strip-shaped hole 4 is 0.1-3 mm, so that the buffer connection portion 2 can have the ability of deformation while maintaining the structural strength thereof, thus achieving effective buffering of the external impact force.

Specific embodiment of the structure of the buffer connection portion 2 of the present invention:

At the end of the housing 1, a plurality of sets of buffer connection portions 2 for fixing the two joint units 5 are provided on the same side; and the plurality of sets of buffer connection portions 2 are arranged symmetrically on the left and right with respect to the central line of the housing 1.

The buffer connection portions 2 are symmetrically arranged on the left and right, so that the force on the entire housing is uniform, achieving good consistency in the buffering effect and aesthetics in the structure.

The buffer connection portion 2 is made of a material having elasticity, which is nylon or polycarbonate (PC) or ABS plastic that features low costs and easy manufacturing.

As shown in FIG. 5, in a specific embodiment of the present invention, an elastomer 7 is added.

At least one elastomer 7 is provided between the inner wall of the accommodating cavity of the housing 1 and the joint unit 5. The elastomer 7 is fixed on the inner wall of the accommodating cavity by means of a reinforcing plate 6.

The elastomer 7 protrudes from the inner wall surface of the cavity of the housing 1, and can abut on the rear end of an outer casing of the joint unit 5, so that the joint unit 5 and the housing 1 can be tightly fitted together to prevent the buffer connection portion 2 from loosening during use.

The elastomer 7 is a spring or a compression spring or is made of elastic polyurethane or a rubber material that features a simple structure and low costs.

As shown in FIG. 6, in a specific embodiment of the present invention, a second elastomer is added.

The second elastomer is fixed on the buffer connection portion 2, and the buffer connection portion 2 is provided with a fixing hole 8 for mounting the second elastomer. The fixing hole 8 is disposed adjacent to the strip-shaped hole 4.

The second elastomer is a spring or a compression spring or is made of elastic polyurethane or a rubber material that features a simple structure and low costs.

In an embodiment of the present invention, a seal is added.

A seal is provided in or around the strip-shaped hole 4 to prevent water or dust from entering the housing 1 via the strip-shaped hole 4. The elastic seal can be elastic rubber, a sealing cloth, or a sealing tape.

Embodiment of the present invention that adopts a quadruped robot body having a flexible buffer structure:

A quadruped robot includes:

a quadruped robot body having a flexible buffer structure as stated above, and a joint unit 5.

The joint unit 5 includes a left front power unit, a right front power unit 52, a left rear power unit 53, and a right rear power unit 54.

The joint unit 5 is mounted on a housing 1 by means of a buffer connection portion 2.

An impact force on the joint unit 5 can be buffered and attenuated by deformation of the buffer connection portion 2.

In the present invention, a strip-shaped hole 4 is provided on the buffer connection portion 2. When the robot is impacted by an external force, the external force can be buffered and attenuated by the deformation of the buffer connection portion 2, thus achieving buffering of the external force. The present invention features a simple structure, low manufacturing costs, no need to reserve an additional mounting space, and a compact structure. The solution is ingenious in conception and is feasible.

The joint unit 5 includes an outer casing end fixed in the housing 1 and a rotary output end exposed from the housing 1.

The outer casing end is screwed to the housing 1, and the housing 1 is provided with the buffer connection portion 2 at a screw connection with the joint unit 5.

Since the screw connection with the joint unit 5 is a key node for bearing the external impact force, the buffer connection portion 2 having a strip-shaped hole 4 being disposed at the screw connection can buffer the external impact force to the greatest extent, thus achieving a good buffering effect.

In the present application, a fixed connection manner may be a screw or welding or riveting or inserting connection or a connection achieved via a third component. A person skilled in the art could make choices according to the actual situations.

Only preferred embodiments of the present invention are described above but are not intended for limiting the present invention. Any modification, equivalent replacement, and improvement made within the spirit and principles of the present invention shall fall within the scope of protection of the present invention.

What is claimed is:

1. A quadruped robot body having a flexible buffer structure, comprising:

a housing having an accommodating cavity;

a buffer connection portion capable of connecting to a fixed end of a joint unit being provided at at least one position on the housing; wherein the buffer connection portion is provided with a connection hole for fixedly connecting to the joint unit; and one or more strip-shaped holes are provided in a region where the buffer connection portion connects to the housing.

2. The quadruped robot body having the flexible buffer structure according to claim 1, wherein the strip-shaped hole is arch-shaped, U-shaped, or arc-shaped.

3. The quadruped robot body having the flexible buffer structure according to claim 1, wherein at the end of the housing, a plurality of sets of buffer connection portions for fixing the two joint units are provided on the same side; and the plurality of sets of buffer connection portions are arranged symmetrically on the left and right with respect to the central line of the housing.

4. The quadruped robot body having the flexible buffer structure according to claim 1, wherein at least one elastomer is provided between the inner wall of the accommodating cavity of the housing and the joint unit, and wherein the elastomer protrudes from the inner wall surface of the cavity of the housing, and can abut on the rear end of an outer casing of the joint unit.

5. The quadruped robot body having the flexible buffer structure according to claim 1, wherein the buffer connection portion is made of a material having elasticity, which is nylon or polycarbonate (PC) or ABS plastic.

6. The quadruped robot body having the flexible buffer structure according to claim 4, wherein the elastomer is a spring or a compression spring or is made of elastic polyurethane or a rubber material.

7. The quadruped robot body having the flexible buffer structure according to claim 5, wherein the width of the strip-shaped hole is 0.1-3 mm, and wherein a seal is provided in or around the strip-shaped hole to prevent water or dust from entering the housing via the strip-shaped hole.

8. A quadruped robot body having a flexible buffer structure, comprising:

a housing having an accommodating cavity; and a buffer connection portion capable of connecting to a fixed end of a joint unit being provided at at least one position on the housing, wherein one or more strip-shaped holes are provided in a region where the buffer connection portion connects to the housing, and wherein, under the action of an external force, the strip-shaped hole can deform to generate a displacement between the hole wall and a surrounding region, forming the flexible buffer structure and thus achieving buffering of the external force.

9. A quadruped robot, comprising:

a quadruped robot body having the flexible buffer structure according to claim 1, and a joint unit; wherein the joint unit is mounted on the housing by means of the buffer connection portion; and an impact force on the joint unit can be buffered and attenuated by deformation of the buffer connection portion.

10. The quadruped robot according to claim 9, wherein the joint unit comprises an outer casing end fixed in the housing and a rotary output end exposed from the housing, and wherein the outer casing end is screwed to the housing, and the housing is provided with the buffer connection portion at a screw connection with the joint unit.

11. The quadruped robot body having the flexible buffer structure according to claim 2, wherein the buffer connection portion is made of a material having elasticity, which is nylon or polycarbonate (PC) or ABS plastic.

12. The quadruped robot body having the flexible buffer structure according to claim 3, wherein the buffer connection portion is made of a material having elasticity, which is nylon or polycarbonate (PC) or ABS plastic.

13. The quadruped robot body having the flexible buffer structure according to claim 4, wherein the buffer connection portion is made of a material having elasticity, which is nylon or polycarbonate (PC) or ABS plastic.

14. The quadruped robot body having the flexible buffer structure according to claim 11, wherein the width of the strip-shaped hole is 0.1-3 mm, and wherein a seal is provided in or around the strip-shaped hole to prevent water or dust from entering the housing via the strip-shaped hole.

15. The quadruped robot body having the flexible buffer structure according to claim 12, wherein the width of the strip-shaped hole is 0.1-3 mm, and wherein a seal is provided in or around the strip-shaped hole to prevent water or dust from entering the housing via the strip-shaped hole.

16. The quadruped robot body having the flexible buffer structure according to claim 13, wherein the width of the strip-shaped hole is 0.1-3 mm, and wherein a seal is provided in or around the strip-shaped hole to prevent water or dust from entering the housing via the strip-shaped hole.

* * * * *